United States Patent
Hofer et al.

(10) Patent No.: US 11,692,881 B2
(45) Date of Patent: Jul. 4, 2023

(54) TEMPERATURE SENSOR THERMAL CONTACT TESTING METHOD AND CIRCUIT

(71) Applicant: SAMSUNG SDI CO., LTD., Yongin-si (KR)

(72) Inventors: Maximilian Hofer, Hartberg (AT); Helmut Hammerschmied, Graz (AT)

(73) Assignee: Samsung SDI Co., Ltd., Yongin-si (KR)

(*) Notice: Subject to any disclaimer, the term of this patent is extended or adjusted under 35 U.S.C. 154(b) by 355 days.

(21) Appl. No.: 16/761,884

(22) PCT Filed: Jun. 1, 2018

(86) PCT No.: PCT/KR2018/006273
§ 371 (c)(1),
(2) Date: May 6, 2020

(87) PCT Pub. No.: WO2019/103264
PCT Pub. Date: May 31, 2019

(65) Prior Publication Data
US 2021/0234208 A1    Jul. 29, 2021

(30) Foreign Application Priority Data
Nov. 24, 2017 (EP) .................... 17203577

(51) Int. Cl.
*H01M 10/48* (2006.01)
*G01K 7/24* (2006.01)
*H01M 10/42* (2006.01)

(52) U.S. Cl.
CPC ............ *G01K 7/24* (2013.01); *H01M 10/486* (2013.01); *H01M 10/48* (2013.01); *H01M 2010/4271* (2013.01)

(58) Field of Classification Search
CPC ......... H01M 10/4285; H01M 10/4271; H01M 10/425; H01M 10/4257; H01M 10/486;
(Continued)

(56) References Cited

U.S. PATENT DOCUMENTS

2002/0048309 A1* 4/2002 Blankenagel .......... G01K 15/00
374/1
2005/0134232 A1 6/2005 Yamamoto
(Continued)

FOREIGN PATENT DOCUMENTS

CN 1630130 A 6/2005
CN 1835360 A 9/2006
(Continued)

OTHER PUBLICATIONS

European Office and European Search Report dated Apr. 3, 2019.
(Continued)

*Primary Examiner* — Raymond Alejandro
(74) *Attorney, Agent, or Firm* — Lee IP Law, P.C.

(57) ABSTRACT

The present invention relates to a testing method for the thermal contact between a temperature sensor (50) and a battery cell (10) of a battery module (30), wherein the method comprises the steps of measuring a temperature $T_1$ of the temperature sensor (50) at a time point $t_1$, heating the temperature sensor (50) for a defined time $(t_2-t_1)$, measuring a temperature $T_2$ of the temperature sensor (50) at a time point $t_2$ and/or a temperature $T_3$ of the temperature sensor (50) at a time point $t_3$, and determining the thermal contact between the temperature sensor (50) and the battery cell (10) based on at least one of the temperature differences $\Delta T_{2,1}=(T_2-T_1)$, $\Delta T_{3,1}=(T_3-T_1)$ and/or $\Delta T_{3,2}=(T_3-T_2)$. The invention further relates to a testing circuit (60) for a temperature sensor (50) of a battery module (30), comprising a thermistor (61) with a first node (67) connected to a first supply
(Continued)

voltage (65) and a second node (68) connected to ground (69), a switch (63) interconnected between the first node (67) of the thermistor (61) and a second supply voltage (66), and an analog-to-digital converter (64) connected in parallel to the thermistor (61). The invention further relates to a cell supervision circuit (40) for a battery module (30), comprising a circuit carrier (45), a testing circuit (60) according to any one of the claims 1 to 10, and a temperature sensor (50) surface mounted to the circuit carrier (45) and comprising a measuring head (51) with a thermistor (61) configured to be brought into thermal contact with a battery cell (10) of the battery module (30).

13 Claims, 4 Drawing Sheets

(58) Field of Classification Search
CPC .... H01M 10/482; H01M 10/48; H01M 10/46; H01M 2010/4271; H01M 2010/4278; G01K 7/24; G01K 7/22
See application file for complete search history.

(56) References Cited

U.S. PATENT DOCUMENTS

| | | |
|---|---|---|
| 2005/0206347 A1 | 9/2005 | Seo et al. |
| 2005/0258800 A1* | 11/2005 | Aradachi ............... H02J 9/005 320/107 |
| 2006/0197498 A1 | 9/2006 | Bucur et al. |
| 2007/0018780 A1 | 1/2007 | Furukawa et al. |
| 2010/0136392 A1 | 6/2010 | Pulliam et al. |
| 2011/0210703 A1 | 9/2011 | Souza et al. |
| 2012/0062041 A1 | 3/2012 | Nelson et al. |
| 2013/0108904 A1 | 5/2013 | Okabayashi |
| 2013/0308684 A1 | 11/2013 | Fluhrer et al. |
| 2014/0369376 A1 | 12/2014 | Keeton |

FOREIGN PATENT DOCUMENTS

| | | |
|---|---|---|
| CN | 102419220 A | 4/2012 |
| CN | 103090983 A | 5/2013 |
| CN | 103424205 A | 12/2013 |
| JP | 2007-18826 A | 1/2007 |
| JP | 2007-64757 A | 3/2007 |
| JP | 2011-203113 A | 10/2011 |

OTHER PUBLICATIONS

International Search Report dated Sep. 7, 2018 for PCT/KR2018/006273.

Chinese Office action and Search Report dated Nov. 2, 2022.

* cited by examiner

【Figure 1】
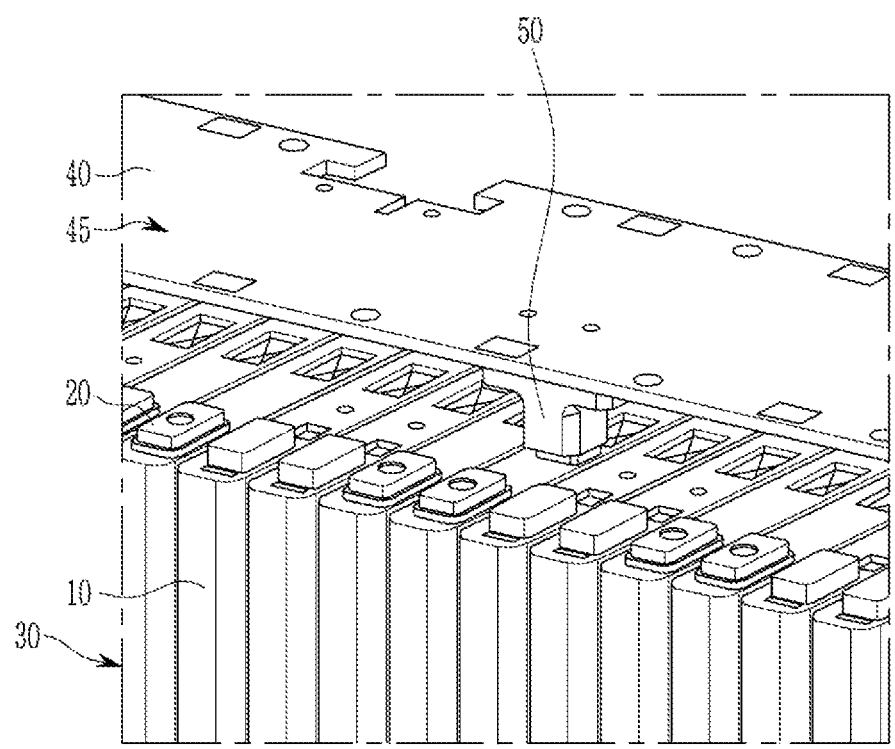

【Figure 2】
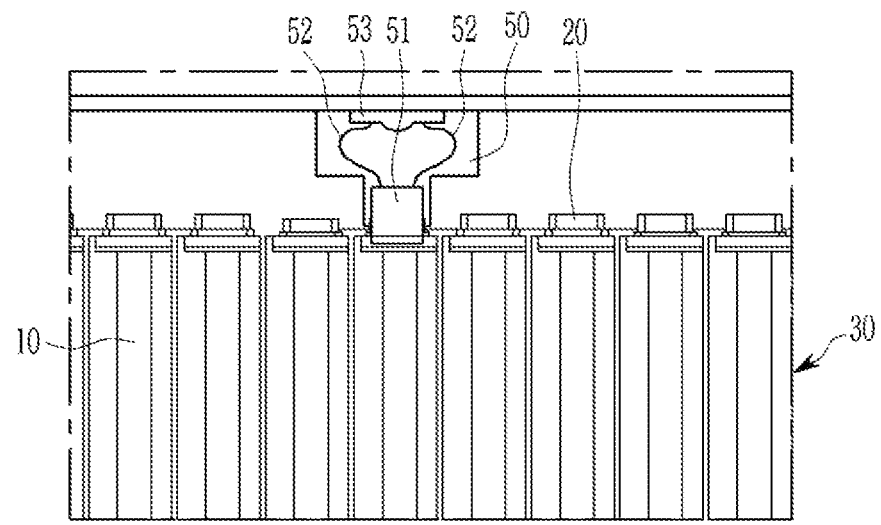
【Figure 3】
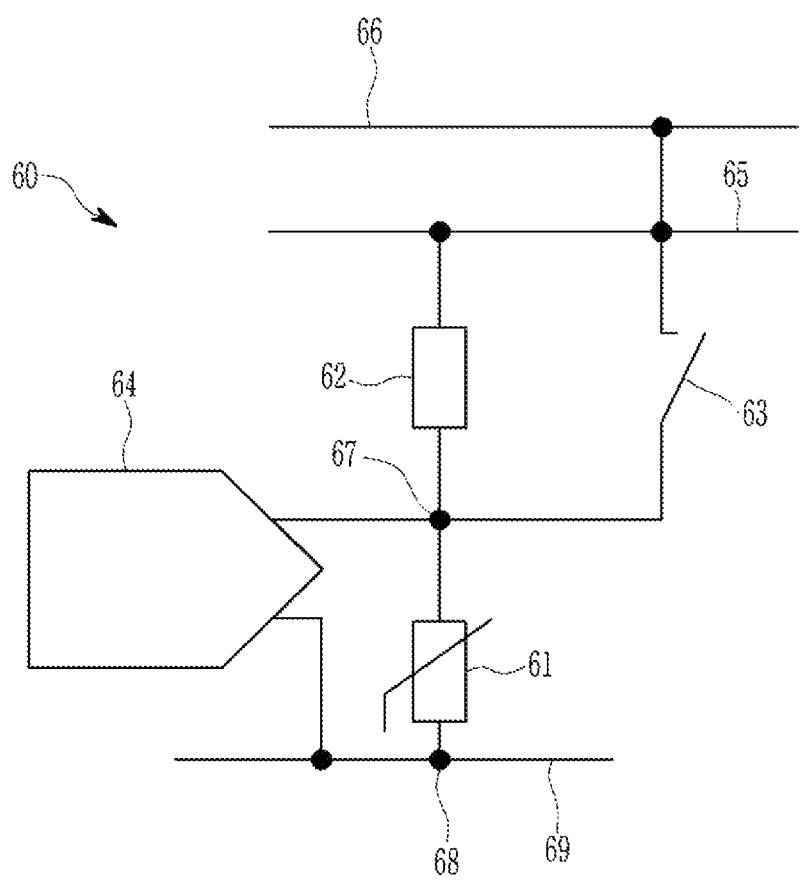

[Figure 4]
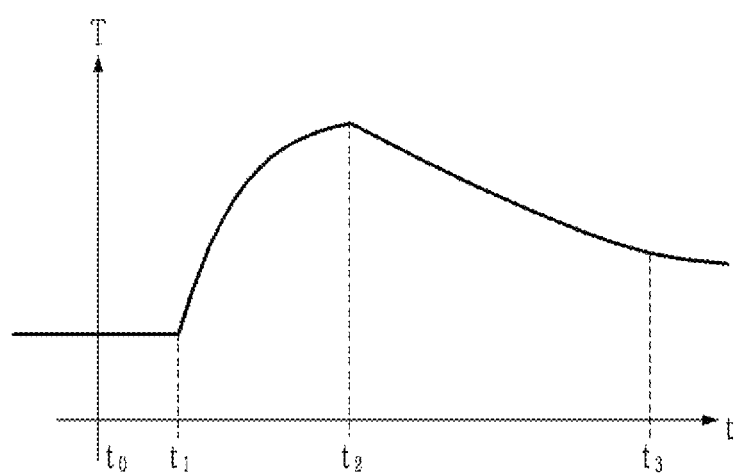

[Figure 5]
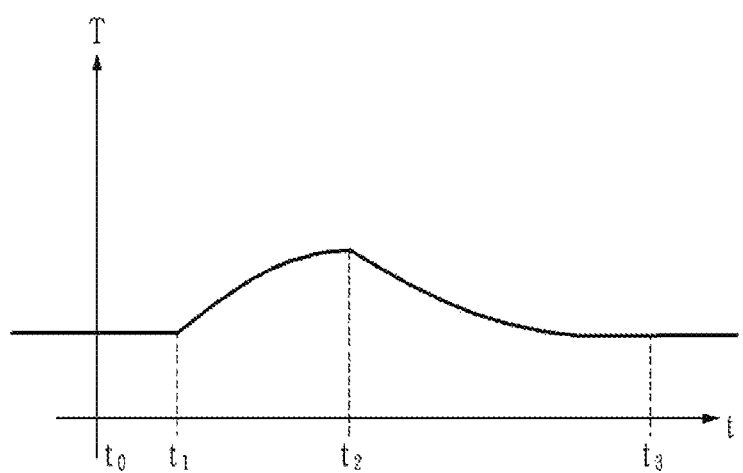

TEMPERATURE SENSOR THERMAL CONTACT TESTING METHOD AND CIRCUIT

CROSS REFERENCE TO RELATED APPLICATIONS

This is the U.S. national phase application based on PCT Application No. PCT/KR1028/006273, filed Jun. 1, 2018, which is based on European Patent Application No. 17203577.6, filed Nov. 24, 2017, the entire contents of all of which are hereby incorporated by reference.

TECHNICAL FIELD

The present invention relates to a testing method for testing the thermal contact of a temperature sensor, particularly the thermal contact of a temperature sensor to the battery cells of a battery module. The invention further relates to a testing circuit for testing the thermal contact of a temperature sensor, particularly according to the method of the present invention. The invention further relates to a cell supervision circuit comprising a testing circuit according to the invention and a thermistor based temperature sensor connected thereto.

BACKGROUND ART

A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose.

Rechargeable batteries may be used as a battery module formed of a plurality of unit battery cells coupled in series and/or in parallel so as to provide a high energy density, e.g. for motor driving of a hybrid vehicle. That is, the battery module is formed by interconnecting the electrode terminals of the plurality of unit battery cells depending on a required amount of power and in order to realize a high-power rechargeable battery, e.g. for an electric vehicle.

Battery modules can be constructed either in block design or in modular design. In block designs each battery is coupled to a common current collector structure and a common battery management system and the unit thereof is arranged in a housing. In modular designs, pluralities of battery cells are connected to form submodules and several submodules are connected to form the battery module. The battery management functions can then be at least partially realized on either module or submodule level and thus interchangeability can be improved. One or more battery modules are mechanically and electrically integrated, equipped with a thermal management system and set up for communication with one or more electrical consumers in order to form a battery system.

The mechanical integration of a battery system requires appropriate mechanical connection of the individual components, e.g. of battery submodules among themselves and with structures of a system providing the electrical consumers, e.g. a vehicle. These connections must be designed to remain functional and safe during the average service life of the battery system and under the stresses provided during use of the consumers. Further, installation space and interchangeability requirements must be met, especially in mobile applications.

To provide electrical integration of a battery system either pluralities of cells connected in parallel are connected in series (XsYp) or pluralities of cells connected in series are connected in parallel (XpYs). Therein pluralities of cells connected in series and/or in parallel may be bundled to battery submodules. XsYp type modules can generate high voltages but the voltage level of each cell hast to be controlled individually and thus wiring complexity is increased. In XpYs type modules the voltage levels of the cells connected in parallel are automatically balanced. Thus the voltage can be controlled on cell or submodule level and wiring complexity is reduced. For cells or submodules connected in parallel the capacitance of the cells add up and thus XpYs type designs are mostly used with low capacitance cells.

For meeting the dynamic power demands of various electrical consumers connected to the battery system, static control of battery power output and charging is not sufficient. Thus, steady exchange of information between the battery system and the controllers of the electrical consumers is required. This information includes the battery system's actual state of charge (SoC), potential electrical performance, charging ability and internal resistance as well as actual or predicted power demands or surpluses of the consumers. Battery systems usually comprise a battery management system (BMS) for processing this information.

The BMS is usually coupled to the controller of one or more electrical consumers as well as to each of the battery modules of the battery system. For controlling a plurality of battery modules by a single BMS a daisy chain setup may be used. In such setup, the BMS, as master, is connected for communication in series to a plurality of battery modules, particularly to a plurality of cell supervision circuits, CSC, of the respective battery modules. Therein, the CSC may be arranged on a printed circuit board, PCB, on top of a respective battery module.

To provide thermal control of a battery system, a thermal management system is required to safely use the at least one battery module by efficiently emitting, discharging and/or dissipating heat generated from its rechargeable batteries. The thermal management system comprises active and/or passive cooling devices for effectively emitting/discharging/dissipating heat from the battery cells. For controlling at least active cooling devices of the thermal management system, temperature sensors are required for measuring an actual temperature of the battery cells. According to the prior art, commonly thermistor based temperature sensors are utilized that are mounted to the circuit carrier, e.g. PCB, of a CSC and brought into thermal contact with one or more battery cells of the battery module.

In the past such thermistor based temperature sensors have been connected by a connector and wires to the PCB, on which the resistance of the sensor has been evaluated.

However, this approach is expensive and hard to manufacture as the temperature sensor is placed close to the cells and distant from the CSC.

According to the prior art, the thermal coupling of the temperature sensor and the cells has been tested exemplarily and manually on sample modules of a battery system. However, in automotive applications of battery systems, an accurate temperature measurement is required in order to fulfil the requirements of functional safety, e.g. ASIL B or ASIL C according to ISO26262. Thus, the thermal contact of the temperature sensor should be tested for each sensor and hence a reliable and automated testing method thereof is required.

DISCLOSURE

Technical Problem

It is thus an object of the present invention to overcome or reduce at least some of the drawbacks of the prior art and to provide an automated measurement of the thermal coupling between a temperature sensor of a battery module and the battery cells of battery module.

Technical Solution

According to one aspect of the present invention refers to a testing method for the thermal contact between a temperature sensor and a battery cell of a battery module. Therein, the testing method of the invention comprises at least the steps described in the following. First, at a time point $t_1$ a temperature $T_1$ of the temperature sensor is measured in order to determine an actual baseline temperature (reference temperature) of the temperature sensor. Next, the temperature sensor is heated for a defined time and/or with a predetermined amount of heat. Therein, the heating time may be predetermined or may be defined based on the predetermined amount of heat. After being heated, a temperature of the temperature sensor is again measured. Therein, a temperature $T_2$ is measured at a time point $t_2$, which occurs immediately after the heating of the temperature sensor or is the time point the heating of the sensor stops. Alternatively, a temperature $T_3$ of the temperature sensor is measured at a time point $t_3$ later than the time point $t_2$, i.e. some time after the heating of the sensor has stopped.

According to the testing method, a thermal contact, preferably a degree of thermal contact, between the temperature sensor and the battery cell is determined based on at least one of the temperature differences $\Delta T_{2,1}=(T_2-T_1)$, $\Delta T_{3,1}=(T_3-T_1)$ or $\Delta T_{3,2}=(T_3-T_2)$. Therein, obviously, the thermal contact is determined solely from a temperature difference that is determined based on temperatures that actually have been measured before. The accuracy of the determined thermal contact increases with the number of temperature differences it is based on and hence preferably two or more of the temperature differences are used for determining the thermal contact. The testing method allows for determining the thermal contact between the temperature sensor and the cells of the battery module, without the need for additional sensors or manual measurements and can be fully implemented and automated by utilizing a driving circuit according to the present invention.

According to a preferred embodiment of the present invention, the temperature sensor comprises a thermistor that is in thermal contact with the battery cell of the battery module. Preferably, the thermistor is a negative temperature coefficient, NTC, thermistor. Alternatively the thermistor is a PTC thermistor. The use of a NTC thermistor in the temperature sensor allows for measuring a temperature of the temperature sensor based on a temperature of the thermistor that is determined based on a resistance of the thermistor. Therein, the resistance of the thermistor might be determined by measuring a voltage drop occurring over the thermistor in response to a predetermined current applied to the thermistor. Particularly preferred, the temperatures $T_1$, $T_2$, and $T_3$ are measured based on a voltage drop over the thermistor. For measuring the corresponding voltage drops preferably a predetermined measurement current is utilized, e.g. corresponding to a first supply voltage of a testing circuit. Using a NTC thermistor further allows for effectively heating the temperature sensor by applying a heating current to the thermistor, e.g. a current corresponding to a second supply voltage of a testing circuit.

Further preferred, the temperature sensor comprises a measuring head that is (configured for being) in thermal contact with the battery cell. Exemplarily, the measuring head is spring loaded in a main body of the temperature sensor for enabling sufficient mechanical contact between the thermistor and at least one battery cell of the battery module. Providing a separate measurement head also allows for further thermally decoupling the thermistor in the measuring head from the circuit carrier the temperature sensor is mounted on.

According to a further preferred embodiment of the present invention, the heating of the temperature sensor comprises the step of applying a heating current to the thermistor for the predefined time. Preferably, in this embodiment the heating current is set such that the predetermined amount of heat is applied to the temperature sensor. The power of Joule heating is proportional to $\Delta V * I_{heat}$, wherein $\Delta V$ refers to the voltage drop over the thermistor and $I_{heat}$ to the heating current applied thereto. Preferably, before the heating step the voltage drop over the thermistor is measured in determining the actual temperate $T_1$ of the thermistor. Based thereon the heating current $I_{heat}$ and the defined time for applying $t_2-t_1$ the heating current is preferably set according to the predetermined amount of heat. Hence, precise heating of the thermistor is easily achieved with high precision in the testing method.

According to the testing method, based on the precise heating and the actual temperature $T_2$ and/or $T_3$ of the thermistor at a time point $t_2$ or $t_3$, respectively, it is determined how effectively heat is transferred from the temperature sensor onto the battery cell. In other words, determining the thermal contact between the temperature sensor and the battery cell is enabled by determining precisely the amount of heat applied to the thermistor as well as the actual temperature rise and/or decay of the thermistor in response thereto. According to the testing method, the determination of thermal contact is preferably solely qualitatively. Particularly preferred, the outcome of the method of the invention is solely whether or not the thermal contact between the battery cell and the temperature sensor is sufficient for allowing for precise temperature measurements of the battery cell with the temperature sensor.

Alternatively preferred the determination of thermal contact is quantitatively. Particularly preferred, the rise of the temperature from $T_1$ to $T_2$ in response to the predetermined amount of heat applied to the thermistor during the time $t_2-t_1$ and/or the decrease of the temperature from $T_2$ to $T_3$ during the time $t_3-t_2$ and/or the change of temperature from $T_1$ to $T_3$ during the time $t_3-t_1$ may be used to determine a heat transfer coefficient T corresponding to the thermal contact between the temperature sensor and the battery cell.

Therein, the time course of the temperature between one or more of the time points $T_1$, $T_2$ and $T_3$ may be fitted to a theoretic time course modelled based on the heat transfer coefficient T in order to determine the actual heat transfer coefficient τ. Preferably and at least with respect to the temperature decrease during $t_3-t_2$, the heat transfer coefficient τ refers to a damping constant for describing the time course of the temperature according to $T(t)=T(t_2)*\exp(-(t-t_2)/\tau)$.

Alternatively, the heat transfer coefficient τ is determined based on at least one a look-up table, LUT, determined during testing of the temperature sensor, e.g. in a test stand of the sensor. Therein, a specific temperature rise in a time period $t_2-t_1$, a specific cooling in a time period $t_3-t_2$ and/or a specific course of temperature in a time period $t_3-t_1$ of the temperature sensor was determined in response to the predetermined amount of heat and for a given degree of thermal contact between the temperature sensor and a battery cell. Hence, by using the LUT the degree of thermal contact for a given pair of temperature $T_1$ and $T_2$, $T_2$ and $T_3$ and/or $T_1$ and $T_3$ is easily determined after applying the predetermined amount of heat.

Another aspect of the present invention refers to a testing circuit for a temperature sensor of a battery module. Therein, the testing circuit at least comprises a thermistor, preferably a NTC thermistor, with a first node connected to a first supply voltage, e.g. VDD1, and with a second node connected to ground. Therein ground refers to a ground voltage of the testing circuit that may actually be a non-zero voltage. The testing circuit further comprises a switch that is interconnected between the first node of the thermistor and a second supply voltage, e.g. VDD2. Therein, the second supply voltage is preferably higher than the first supply voltage. The testing circuit further comprises an analog-to-digital converter, ADC, connected in parallel to the thermistor, preferably to the first and the second node of the thermistor. The testing circuit of the present invention allows for an easy implementation of the testing method of the invention and is easily integrated into a CSC of the battery module.

To perform the testing method, the thermistor of the testing circuit is brought in thermal contact to at least one battery cell of a battery module to be supervised. In other words, the thermistor is part of a temperature sensor as described above. During a normal operation of the battery module, the testing circuit is operated as part of a thermal management system of the battery module. Therein, the switch is set non-conductive such that solely the first supply voltage is applied to the thermistor. The ADC measures the voltage drop over the thermistor and converts the measured analog signal to a digital output. As the electric resistance of the thermistor depends on its temperature the measured voltage drop and hence the digital signal output by the ADC represents the temperature of the thermistor. In order to perform the testing method, the temperature $T_1$ of the thermistor is determined based on this digital output of the ADC at a time point $t_1$. In order to determine the thermal contact between the thermistor, i.e. the temperature sensor, and the battery cell, the switch of the testing circuit is set conductive for a defined time $t_2-t_1$ in order to also apply the second operation voltage, VDD2, to the thermistor for the defined time. Thus, an additional current $I_{heat}$ is applied to the thermistor during the time span $t_2-t_1$ and the thermistor is hence heated up to a temperature $T_2$ until the switch is set non-conductive again at time point $t_2$. At time point $t_2$ the temperature of the thermistor is again measured based on the voltage drop over the thermistor via the ADC. Based on at least the temperature difference $\Delta T_{2,1}=T_2-T_1$ and the predetermined amount of heat applied to the thermistor, the thermal contact, preferably the degree of thermal contact, between the thermistor and the battery cell is determined. In a preferred embodiment, the thermistor is allowed to cool for a defined time $t_3-t_2$ during which the switch stays non-conductive. At the end of this time span, the temperature $T_3$ of the thermistor is determined via the ADC based on the voltage drop over the thermistor. Preferably the thermal contact, preferably the degree of thermal contact between the temperature sensor and the battery cell, is then additionally determined based on at least one of the temperature difference $\Delta T_{3,1}=T_3-T_1$ and $\Delta T_{3,2}=T_3-T_2$.

According to a preferred embodiment, the testing circuit further comprises a resistor interconnected between the first node of the thermistor and the first supply voltage in order to precisely set the voltage, i.e. the testing current, applied to the thermistor during the normal operation as described above. Further preferred, the testing circuit further comprises a control unit with a first output pin connected to the switch and a first input pin connected to the ADC. In other words, the control unit is configured to set the switch conductive at time point $t_1$ and non-conductive at time point $t_2$ by applying respective control signals thereto via the first output pin. Exemplarily, the switch may be an NPN MOSFET and the control unit is configured to apply a voltage VDD to the gate of the MOSFET during the time span $t_2-t_1$ and a voltage VSS before time point $t_1$ and after the time point $t_2$. Alternatively, the switch is a relay or another electromechanical switch and the control unit is configured to apply a signal for setting the electromechanical switch during time point $t_2-t_1$ and non-conductive before the time point $t_1$ at after the time point $t_2$, respectively.

Particularly preferred, the control unit is a microprocessor supervisor circuit configured to be used with battery modules and is further configured to measure voltages of at least one cell of the battery module via at least one respective input and/or to balance the voltages of the battery cells of the battery module, e.g. passively via integrated bleed resistors. According to a further preferred embodiment, the control unit comprises a second output pin that is configured for providing the first supply voltage and a third output pin that is configured for providing the second supply voltage. Particularly preferred the control unit is or is similar to a LTC6811 from Linear Technology that is adapted and/or programmed to fit into the testing circuit and to perform the testing method.

Another aspect of the present invention relates to a cell supervision circuit, CSC, for a battery module that comprises a circuit carrier (e.g. a printed circuit board, PCB, a flexible circuit carrier or a substrate), the testing circuit as described above and a temperature sensor that is surface mounted to the circuit carrier and that comprises a measuring head with a thermistor. Therein, the thermistor is configured to be brought into thermal contact with a battery cell of the battery module. Preferably, the temperature sensor protrudes from a surface of the circuit carrier facing towards the battery cells of the battery module. Therein, the measuring head is placed away from the circuit carrier and in thermal contact with the cells. In other words the flat circuit carrier has a first main surface configured for facing the battery module and a second main surface opposite the first main surface, wherein the temperature sensor is mounted on the first main surface. Preferably, the temperature sensor is mounted via pressfits to the first main surface or is soldered thereto.

Particularly preferred, the CSC further comprises at least one spacer, preferably a plurality of spacers, protruding from the first main surface of the circuit carrier. Therein, the height of the spacers in a normal direction of the first main surface corresponds to the height of the temperature sensor in this direction. Therein, the circuit carrier is mounted with a fixed distance to an upper side of the battery module and hence thermal contact between the circuit carrier and the cells is negligible. Preferably, thermal contact between the temperature sensor and the battery cells is solely provided by the measuring head, particularly the thermistor, of the temperature sensor. Particularly preferred, the measuring head is spring loaded in the temperature sensor and thus configured to bridge the gap between the circuit carrier and the battery cells that is spanned by the at least one spacer. By spring loading the measuring head thermal decoupling between the battery cells and the remaining temperature sensor (not the measuring head) or the circuit carrier is further improved.

Further preferred, the cell supervision circuit comprises an evaluation circuit that is configured for determining a temperature of the measuring head based on a digital output of the ADC. The evaluation circuit is preferably mounted on and/or structured into the circuit carrier of the cell supervision circuit. The evaluation circuit is either integral or external to a control unit as described above. Preferably, the cell supervision circuit is further configured to determine the cell voltage of at least one battery cell of the battery module and/or to perform balancing between at least two battery cells of the battery module, wherein these functions are either realized by a control unit, e.g. a LTC6812 microprocessor, or by analog circuits disposed on and/or within the circuit carrier.

Further aspects of the present invention are disclosed in the dependent claims or the following description of the drawings. Different embodiments or aspects of the present invention as described herein are advantageously combined if not explicitly stated otherwise.

Advantageous Effects

An exemplary embodiment of the preset invention may provide a testing method for the thermal contact between a temperature sensor and a battery cell of a battery module.

DESCRIPTION OF DRAWINGS

Features will become apparent to those of ordinary skill in the art by describing in detail exemplary embodiments with reference to the attached drawings in which:

FIG. 1 illustrates a schematic perspective view of a battery module with a cell supervision circuit, CSC, according to an embodiment;

FIG. 2 illustrates a schematic side view of a battery module with a cell supervision circuit, CSC, according to an embodiment;

FIG. 3 schematically illustrates a testing circuit according to an embodiment;

FIG. 4 schematically illustrates a temperature curve obtained in a method according to an embodiment; and FIG. 5 schematically illustrates another temperature curve obtained in a method according to an embodiment.

BEST MODE

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art.

Accordingly, processes, elements, and techniques that are not considered necessary to those having ordinary skill in the art for a complete understanding of the aspects and features of the present invention may not be described. In the drawings, the relative sizes of elements, layers, and regions may be exaggerated for clarity.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

FIGS. 1 and 2 illustrates a schematic perspective view and a schematic side view of a battery module 30 with a PCB 45 carrying a cell supervision circuit 40, CSC, according to an embodiment.

Referring to FIGS. 1 and 2, a temperature sensor 50 according to an embodiment is mounted directly to the PCB 45 of carrying the CSC 40 of a battery module 30. Therein, the PCB 45 is placed over the cells 10, particularly above the cell terminals 20, and thermally coupled thereto via a measuring head 51 of the temperature sensor 50 that is connected via wires 52 to an evaluation circuit 53 as part of the CSC 40.

The temperature of the PCB 45 might differ significantly from the temperature of the cells 10. As only the temperature of the cells 10 shall be measured while an influence of the PCB's temperature shall be negligible, it is critical that the thermal coupling of the temperature sensor 50, particularly of its measuring head 51, to the cells 10 is significantly better than the thermal coupling of the sensor 50 to the PCB 45. Preferably, a thermal coupling of the sensor 50 to the cells 10 exceeds the thermal coupling between the sensor 50 and the PCB 45 by a factor of 10 to 100 in order to ensure accurate temperature measurements.

The CSC 40 may form an embodiment of the present invention if it comprises a testing circuit 60 according to an embodiment of the invention as described with reference to FIG. 3 below.

The CSC 40 on the PCB of FIGS. 1 and 2 is configured for setting up a communication connection between multiple battery modules 30 of a battery system and a BMS of the battery system. Therefore, the cell supervision circuit carrier 40 comprises a connector (not shown) for setting up a daisy chain. The connector serves as input/output for a communication between the BMS and the CSCs 40 of the battery modules 30. The CSC 40 is preferably configured to monitor the cell voltages of some or each of a battery module's 30 battery cells 10 via the at least one cell voltage input pin and may further be configured to actively or passively balance the voltages of the individual battery cells of the module via control signals output via respective output pins. Exemplarily, the CSC 40 might comprise a plurality of resistors that are connectable to the individual cells 10 for passively balancing the battery module 30 by dissipating energy of the highest voltage battery cells 10.

FIG. 3 schematically illustrates a testing circuit according to an embodiment. The testing circuit comprises a first line 65 providing a first supply voltage VDD1 and a second line 66 providing a second supply voltage VDD2. The first supply voltage 65 is supplied via a resistor 62 and a first thermistor node 67 to a NTC thermistor 61 and via a second thermistor node 68 to a ground line 69. In other words, the thermistor 61 is interconnected between a first supply voltage 65 VDD1 (via the resistor 62) and ground 69. The first thermistor node 67 is further connected to a second supply voltage VDD2 on second line 66 via the switch 63. Further an ADC 64 is connected to the first thermistor node 67 and the second thermistor node 68 for measuring a voltage drop over the thermistor 61.

Also not shown in FIG. 3, the testing circuit 60 further comprises a control unit that is connected via a first output pin to the switch 63 for either setting the switch conductive or non-conductive depending on an output of the control unit. A first input pin of the control unit is further connected to the ADC 64 for receiving a digital output of the ADC 64 corresponding to the voltage drop over the thermistor 61 and output via an output line of the ADC 64. A second output pin of the control unit is connected to the first line 65 and provides the first supply voltage VDD1 thereto and a third output pin of the control unit is connected to the second line 66 and provides the second supply voltage thereto.

The function of the testing circuit 60 as shown in FIG. 3 is now described with respect to the temperature curves as illustrated in FIGS. 4 and 5. For performing a testing method of the invention, a measuring head 51 of a temperature sensor as shown in FIG. 2 and comprising the thermistor 61 is first brought into thermal contact with the battery cell 10. At a time point $t_1$ the temperature of the thermistor 61 is determined based on a voltage drop of the first supply voltage VDD1 supplied to the thermistor via first line 65 and resistor 62. Further, at time point $t_1$ and subsequent to this measurement, the control unit outputs a control signal to the switch 63 for setting it conductive such that also the second supply voltage VDD2 is applied to the thermistor via the second line 66. Hence an additional heating current $I_{heat}$ is supplied to the thermistor during the time span $t_2$–$t_1$ thus heating up the thermistor 61. At time point $t_2$ the switch 63 is set non-conductive again by ceasing the control signal of the control unit. Consequently, the thermistor is allowed to cool down in a time span $t_3$–$t_2$. A temperature $T_1$, $T_2$ and $T_3$ of the thermistor 61 is determined via the ADC 64 based on a voltage drop over the thermistor 61 measured at each of the time points $t_1$, $t_2$ and $t_3$, respectively.

In FIG. 4 the temperature curve of a NTC thermistor 61 with a bad thermal coupling to the battery cell 10 of the battery module 30 is depicted. In FIG. 5 the temperature curve of a NTC thermistor 61 with a good thermal coupling to the battery cell 10 of the battery module 30 is depicted In FIG. 4 the temperature $T_2$ at point $t_2$ is much higher than the temperature $T_2$ at time $t_2$ at the thermally well coupled NTC thermistor 61 of FIG. 5. Based on such differences a bad thermal contact between the thermistor 61 of FIG. 4 and the battery cell 10 is easily detected. The differences between the temperature curves of FIGS. 4 and 5 are due to that in FIG. 4 the additional energy provided by the heating current $I_{heat}$ due to the second supply voltage VDD2 is predominantly heating up the thermistor 61, while in FIG. 5 the predetermined amount of heat generated in thermistor 61 due to the heating current $I_{heat}$ is effectively transferred onto the battery cell 10 due to a good thermal contact there between. The same consideration applies to the temperatures at the time points t3, wherein the thermally bad coupled (to battery cell 10) thermistor 61 of FIG. 4 cools down much slower than the thermally well coupled thermistor 61 of FIG. 5.

The electronic or electric devices and/or any other relevant devices or components according to embodiments of the present invention described herein, except those described explicitly as hardware, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g. on a PCB or another kind of circuit carrier. The conducting elements may comprise metallization, e.g. surface metallizations and/or pins, and/or may comprise conductive polymers or ceramics. Further electrical energy might be transmitted via wireless connections, e.g. using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

REFERENCE SIGNS 10 battery cell
20 cell terminal
30 battery module
40 Cell Supervision Circuit
45 printed circuit board (PCB)
50 temperature sensor
51 measuring head
52 wires
53 evaluation circuit
60 testing circuit
61 thermistor (NTC)
62 resistor
63 switch
64 analog-to-digital-converter (ADC)
65 first supply voltage (VDD1)
66 second supply voltage (VDD2)
67 thermistor first node
68 thermistor second node
69 ground

The invention claimed is:

1. A testing circuit for a temperature sensor of a battery module, the testing circuit comprising:
    a temperature sensor including a thermistor with a first node connected to a first supply voltage and a second node connected to ground;
    a switch interconnected between the first node of the thermistor and a second supply voltage wherein the switch is configured to connect and disconnect the second supply voltage from the first node of the thermistor; and
    an analog-to-digital converter configured to measure a voltage drop over the thermistor, connected in parallel to the thermistor, wherein the testing circuit is integrated into a cell supervision circuit of the battery module.

2. The testing circuit as claimed in claim 1, further comprising a resistor interconnected between the first node of the thermistor and the first supply voltage.

3. The testing circuit as claimed in claim 1, wherein the thermistor is a negative temperature coefficient thermistor.

4. The testing circuit as claimed in claim 1, further comprising a control unit with a first output pin connected to the switch and a first input pin connected to the analog-to-digital converter.

5. The testing circuit as claimed in claim 1, wherein the thermistor is a positive temperature coefficient thermistor.

6. The testing circuit as claimed in claim 1, wherein the second supply voltage is higher than the first supply voltage.

7. The testing circuit as claimed in claim 1, wherein the analog-to-digital converter is connected to the first node and the second node of the thermistor.

8. The testing circuit as claimed in claim 1, wherein the switch is a negative-positive-negative metal-oxide-semiconductor field-effect transistor.

9. The testing circuit as claimed in claim 1, wherein switch is an electromechanical switch.

10. The testing circuit as claimed in claim 1, wherein the control unit further comprises a second output pin configured to provide the first supply voltage and a third output pin configured to provide the second supply voltage.

11. The testing circuit as claimed in claim 1, wherein the temperature sensor further comprises a measuring head configured to contact a battery cell of the battery module.

12. The testing circuit as claimed in claim 11, wherein thermal contact between the temperature sensor and the battery cell is solely provided by the measuring head of the temperature sensor.

13. The testing circuit as claimed in claim 11, wherein the measuring head is spring loaded in the temperature sensor and configured to bridge the gap between a circuit carrier and the battery cell.

* * * * *